United States Patent
Underwood et al.

(10) Patent No.: US 7,049,252 B2
(45) Date of Patent: May 23, 2006

(54) COATED FABRIC FOR LUGGAGE

(75) Inventors: Joey K. Underwood, Greenville, SC (US); T. Doyle Kelley, Greenville, SC (US)

(73) Assignee: Safety Components Fabric Technologies, Inc., Greenville, SC (US)

(*) Notice: Subject to any disclaimer, the term of this patent is extended or adjusted under 35 U.S.C. 154(b) by 0 days.

(21) Appl. No.: 10/868,526

(22) Filed: Jun. 15, 2004

(65) Prior Publication Data

US 2004/0229537 A1    Nov. 18, 2004

Related U.S. Application Data

(62) Division of application No. 09/728,590, filed on Dec. 1, 2000, now Pat. No. 6,750,162.

(51) Int. Cl.
*B32B 27/12* (2006.01)

(52) U.S. Cl. .............. 442/148; 442/79; 442/83; 442/85; 442/86; 442/89; 442/97; 442/98; 442/101; 442/104; 442/107; 442/164; 442/168; 442/169; 442/203; 442/217; 442/218; 442/220

(58) Field of Classification Search .............. 442/79, 442/83, 85, 86, 89, 97, 98, 101, 104, 107, 442/164, 168, 169, 203, 217, 218, 220, 148
See application file for complete search history.

(56) References Cited

U.S. PATENT DOCUMENTS

| | | | |
|---|---|---|---|
| 3,068,187 A | 12/1962 | Bolstad et al. | |
| 3,252,932 A | 5/1966 | Bolstad et al. | |
| 3,329,661 A | 7/1967 | Smith et al. | |
| 3,330,812 A | 7/1967 | Smith et al. | |
| 3,356,628 A | 12/1967 | Smith et al. | |
| 3,476,583 A | 11/1969 | Elkind et al. | |
| 3,650,880 A * | 3/1972 | Tieniber | 442/76 |
| 4,483,900 A | 11/1984 | Goldfarb | |
| 4,610,918 A * | 9/1986 | Effenberger et al. | 442/68 |
| 4,943,473 A * | 7/1990 | Sahatjian et al. | 442/289 |
| 4,965,408 A | 10/1990 | Chapman et al. | |
| 5,026,591 A | 6/1991 | Henn et al. | |
| 5,116,682 A | 5/1992 | Chakravarti et al. | |
| 5,187,005 A * | 2/1993 | Stahle et al. | 442/208 |
| 5,418,051 A * | 5/1995 | Caldwell | 442/61 |
| 5,565,264 A | 10/1996 | Howland | |
| 5,594,061 A | 1/1997 | Sharma et al. | |
| 5,630,846 A | 5/1997 | Hara et al. | |

(Continued)

FOREIGN PATENT DOCUMENTS

DE        2737756        3/1979

OTHER PUBLICATIONS

"Ultratex® REP", Economical silicone elastomer macroemulsion for use with fluorochemical oil and water repellants, *Ciba Technical Bulletin*, 1 page.

(Continued)

*Primary Examiner*—Ula Ruddock
(74) *Attorney, Agent, or Firm*—Dority & Manning, P.A.

(57) ABSTRACT

An abrasion resistant and water resistant fabric is disclosed. The fabric is particularly well suited for use in constructing luggage. The fabric, however, is also well suited for many other applications, such as use in constructing sportswear, outdoor apparel, military apparel, and the like. The fabric is treated with a chemical composition. It has been discovered that the chemical composition greatly enhances the abrasion resistance of the fabric. In one embodiment, the fabric is made from nylon multifilament yarns.

19 Claims, 1 Drawing Sheet

U.S. PATENT DOCUMENTS

| | | | | |
|---|---|---|---|---|
| 5,674,951 A | * | 10/1997 | Hargis et al. | 525/410 |
| 5,721,309 A | | 2/1998 | Sharma et al. | |
| 5,837,623 A | | 11/1998 | Howland | |
| 5,843,851 A | | 12/1998 | Cochran | |
| 5,876,792 A | * | 3/1999 | Caldwell | 427/171 |
| 5,976,996 A | | 11/1999 | Howland | |

OTHER PUBLICATIONS

"Zonyl® FMX", New Generation Oil and Water Repellant Fluoropolymer Fabric Protector, *Ciba Technical Bulletin*, 3 pages.

"Material Safety Data Sheet", Ultratex Rep, Ciba, 5 pages.

* cited by examiner

COATED FABRIC FOR LUGGAGE

RELATED APPLICATIONS

The present application is a divisional application of U.S. application Ser. No. 09/728,590, which was filed on Dec. 1, 2000, and which issued as U.S. Pat. No. 6,750,162.

FIELD OF THE INVENTION

The present invention generally relates to fabrics that are useful in the construction of luggage. More particularly, the present invention is directed to luggage fabrics having improved abrasion resistance properties.

BACKGROUND OF THE INVENTION

Fabrics that are appropriate for use in the construction of luggage must be durable and must be able to withstand weather conditions and other harsh conditions to which luggage is often subjected. In designing a fabric for use in the construction of luggage, it is important to look at various factors including abrasion resistance.

In the past, the abrasion resistant properties of fabrics used in the construction of luggage were improved primarily by changing the construction of the fabric. For example, the denier of the yarns, the weave of the fabric, and the materials used to produce the fabric were varied in order to optimize the properties of the fabric. For example, recently nylon fabrics historically used in ballistic applications have been used to construct luggage. These fabrics have proved to be very durable in luggage applications.

Although many advances have been made to improve the durability of luggage fabrics, a need still remains for a luggage fabric having enhanced abrasion resistant properties. In particular, a need exists for a process for improving the abrasion resistance of fabrics.

SUMMARY OF THE INVENTION

The present invention recognizes and addresses the foregoing needs, and others in the field of luggage fabrics.

The present invention is directed toward a fabric for constructing luggage. The fabric can be made, for instance, from multifilament yarns. The multifilament yarns can be made from various materials including polyester, cotton, nylon, polypropylene and the like. In one preferred embodiment, the fabric is made from nylon yarns, such as yarns typically used to produce ballistic fabrics.

In accordance with the present invention, the fabric is treated with a chemical composition. In particular, the chemical composition is incorporated into the fabric such that the fabric has an abrasion resistance that is twice the abrasion resistance of the woven fabric not similarly treated.

In one embodiment, for instance, the chemical composition includes a fluorocarbon polymer composition. For example, the fluorocarbon polymer composition can be a dispersion of perfluoroalkyl and polyisocyanate polymers. The fluorocarbon polymer composition can be present in the treatment solution at an amount of less than about 5% solids, particularly less than about 3% solids, and more particularly at about 1% solids. The fluorocarbon polymer composition is applied to the fabric at an add on rate of about 1% add on of the fluorocarbon polymer based upon the weight of the fabric. Besides containing a fluorocarbon polymer composition, the chemical composition can also contain an emulsifier, wetting agents, drying agents, and water.

It has been discovered that the chemical composition greatly improves the abrasion resistance of the fabric. In fact, the addition of the chemical composition finish to the fabric will double the abrasion resistance of the fabric. In one embodiment, nylon fabrics used in ballistic applications are utilized as the base fabric. The fabric can have an abrasion resistance of at least 2500 cycles, particularly at least 3500 cycles, and more particularly at least 4000 cycles when finished with the chemical composition of the present invention.

Fabrics made in accordance with the present invention can have various constructions and characteristics. Depending upon the particular application of the fabric, the fabric can be made from various materials, various yarns, and can have a wide range of basis weights.

In one embodiment, the fabric treated in accordance with the present invention can be made from yarns having a denier of from about 800 to about 1400, and particularly from about 1000 to about 1300. The fabric can have from about 30 to about 60 ends per inch, and particularly from about 40 to about 50 ends per inch. Further, the fabric can have from about 36 to about 46 picks per inch. The yarns can also be twisted if desired. For instance, the yarns can have from about 2 to about 5 twists per inch and particularly from about 2½ to about 3½ twists per inch.

The finished weight of the fabric can vary depending upon the particular application. For instance, the fabric can have a finished weight of from about 8 ounces per square yard to about 20 ounces per square yard, and particularly from about 10 ounces per square yard to about 15 ounces per square yard.

Other features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
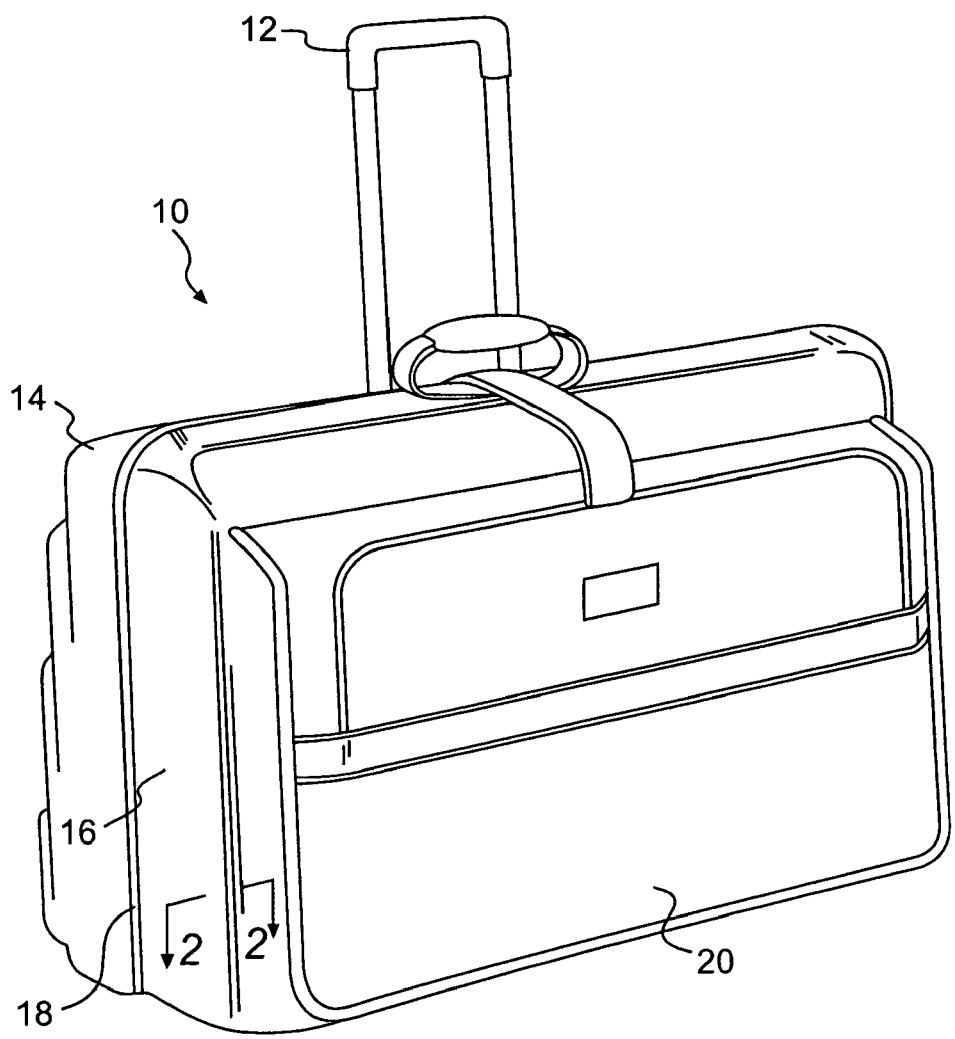
FIG. 1 is a piece of luggage made in accordance with the present invention.

Repeat use of reference characters in the present specification and drawings is intended to represent same or analogous features or elements of the present invention.

DEFINITIONS AND STANDARDIZED PROCEDURES

The following definitions and procedures are offered in order to better describe and quantify the performance of luggage and fabrics made according to the present invention.

Taber Abrasion Test

The Taber Abrasion test measures the number of cycles required for an abrasion wheel to wear completely through the fabric. Specifically, the Taber Abrasion tests were performed by applying a 1000 gram weight to an H18 abrasion wheel and then spinning the wheel in contact with the fabric until a certain level of wear or abrasion was reached. The number of cycles the wheel completed before this level of wear or abrasion was reached serves as the Taber Abrasion measurement in the form of number of cycles.

Grab Tensile Test

The grab tensile test used herein measures breaking strength of a fabric when subjected to unidirectional stress. This test is known in the art and conforms to ASTM D 5034. The results are expressed in pounds to break. Higher numbers indicate a stronger fabric. The values noted herein, measured in pounds, represent the "load" or the maximum load or force, expressed in units of weight, required to break or rupture the specimen in a tensile test.

The grab tensile test uses two clamps, each having two jaws with each jaw having a facing in contact with the fabric sample. The clamps hold the fabric in the same plane, usually vertically, separated by approximately three inches and move apart at a specified rate of extension. Values for grab tensile strength are obtained using a sample size of 4 inches by 6 inches with a jaw facing size of 1 inch by 1 inch, and a constant rate of extension of 300 mm/minute. The sample is wider than the clamp jaws to give results representative of effective strength of yarns in the clamped width combined with additional strength contributed by adjacent yarns in the fabric. Usually, a grab tensile strength test closely simulates fabric stress conditions in actual use. Results are reported as an average of three specimens and may be performed with the specimen in the cross direction or the machine direction.

Trap Tear Test

The values noted herein for tear strength were obtained through use of the Trap Tear test. The trapezoid or "trap" tear test is a tension test that is useful in estimating the relative ease of tearing a fabric. It is particularly useful in the determination of any appreciable difference in strength between the machine and cross direction of the fabric. The entire width of the specimen is gripped between clamps, thus the test primarily measures the bonding or interlocking strength of individual yarns directly in the tensile load, rather than the strength of the composite structure of the fabric as a whole.

In conducting the trap tear test used herein, an outline of a trapezoid is drawn on a 3 inch by 6 inch specimen with the longer dimension in the direction being tested, and the specimen is cut in the shape of the trapezoid. The trapezoid has a 4 inch side and a 1 inch side which are parallel and which are separated by 3 inches. A small preliminary cut of ⅝ inches is made in the middle of the shorter of the parallel sides.

The specimen is clamped into a testing device that has 3 inch long parallel clamps. The specimen is clamped along the non-parallel sides of the trapezoid so that the fabric on the longer side is loose and the fabric along the shorter side taut, and with the cut halfway between the clamps. A continuous load is applied on the specimen such that the tear propagates across the specimen width. It should be noted that the longer direction is the direction being tested even though the tear is perpendicular to the length of the specimen. The force required to completely tear the specimen is recorded in pounds with higher numbers indicating a greater resistance to tearing. The test method used conforms to ASTM D-5587 except that the tearing load is calculated as the average of the first and highest peaks recorded rather than the lowest and highest peaks. Five specimens for each sample are usually tested.

Raveled Strip Test

The Raveled Strip test was also performed on fabric samples made according to the present invention. The Raveled Strip test is a test for determining the breaking force and elongation of most textile fabrics. The test method used was a modified version of ASTM D 5035. The only modification made herein to the standard test method was to change from 1 inch wide strips to 10 mm wide strips in order to test only the abraded area of a test specimen or the area already subjected to the Taber Abrasion test.

In general, according to the Raveled Strip test, a test specimen is clamped in a tensile testing machine and a force is applied to the specimen until it breaks. Values for the breaking force and elongation of the test specimen are obtained and recorded.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a fabric suitable for use in the construction of luggage that has significantly improved abrasion resistant properties. In particular, the present invention is directed to a luggage fabric treated with a chemical composition, such as a durable water resistant composition. The present inventors discovered that the durable water resistant composition not only makes the fabric water resistant, but also imparts abrasion resistance to the fabric. In one embodiment, the water resistant finish may include a fluoropolymer.

Referring to FIG. 1, one embodiment of a piece of luggage generally 10 constructed in accordance with the present invention is illustrated. It should be understood that the fabric of the present invention can be used in any suitable type of luggage or bag. In the embodiment illustrated in FIG. 1, luggage 10 includes a first side 14 connected to a second side 16 by a zipper 18. Luggage 10 further includes a handle 12 and optionally can include wheels and rollers for moving the luggage once filled. Further, the luggage can include various additional compartments as desired.

As shown, luggage 10 is made from a fabric 20. Fabric 20 is made from woven polymeric yarns.

Figure 2:
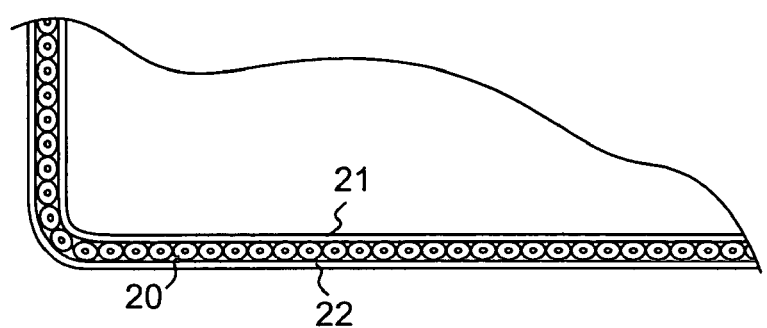
FIG. 2 is a partial cross-sectional view of the luggage illustrated in FIG. 1.

As shown in FIG. 2, fabric 20 includes a water barrier layer 21 applied to the inside surface of the fabric. The water barrier layer 21 can be made from various materials, such as polyurethanes, urethanes or a polyvinyl chloride film.

In accordance with the present invention, the exterior surface of the fabric includes a chemical composition 22. The chemical composition 22, applied to the fabric in accordance with the present invention has been found to be extremely durable and well suited for use in luggage applications. It was also discovered that the chemical composition significantly improves the abrasion resistance of the fabric. In particular, it was discovered by the present inventors that the chemical composition of the present invention can more than double the abrasion resistance of the fabric. In other words, a fabric treated in accordance with the present invention will have an abrasion resistance two times higher than the untreated fabric itself.

Fabrics that are suitable for use in the process of the present invention may be manufactured with yarns made of nylon, polyester, cotton, polypropylene, polyethylene, mixtures thereof, and other similar yarns. For most applications, however, nylon is preferred. For example, in one embodiment, nylon yarns can be used that have been used in the past in ballistic applications.

The yarns used in the fabric to be treated with the water resistant, abrasion resistant treatment may be woven into various constructions. For instance, the fabric of the present invention can have a basket weave or a plain weave. Any other suitable weave may be employed, for example such as a ripstop weave or a twill weave.

The weight of the fabric made in accordance with the present invention can vary and generally will depend upon the particular application for which the fabric is used. For most applications, however, the fabric can have a weight of from about 4 ounces per square yard to about 20 ounces per square yard. When used to construct luggage, the fabric will generally have a weight of from about 10 ounces per square yard to about 15 ounces per square yard, and particularly from about 11 ounces per square yard to about 14 ounces per square yard. In general, the yarns used to construct the fabric are multifilament yarns, although it is believed that monofilament yarns may be used in some applications. The denier of the yarns again will vary depending upon the type of product being formed with the fabric. In general, however, the denier of the yarns can be from about 100 to about 2000, particularly from about 390 to about 1600 and, in one embodiment, from about 1000 to about 1300. For example, the denier of the yarns can be from about 1050 to about 1260.

When using multifilament yarns, it may also be desirable to incorporate twists into the yarn, prior to forming the fabric. For instance, the yarns can have from about 2 to about 5 twists per inch, and particularly from about 2½ to about 3½ twists per inch.

When using yarns within the above described denier ranges, the woven fabric of the present invention can have from about 30 ends to about 60 ends per inch, which refers to the warp yarn density. More particularly, the fabric can have from about 40 to about 45 ends per inch. The number of picks, which refers to the fill yarn density, on the other hand, can generally vary from about 36 picks per inch to about 46 picks per inch.

As described above, once the fabric of the present invention is constructed, generally first a water impermeable barrier layer is applied to the inside surface of the fabric. The water impermeable coating can be a film either extruded onto or laminated to the fabric. The film can be made from a urethane, a polyurethane, polyvinyl chloride or other suitable material.

Once the water impermeable coating is applied to the fabric, a finish is then applied to the opposite side of the fabric in accordance with the present invention. As discussed above, when applied according to the present invention, it has been discovered that the finish is very durable and wear resistant. Further, the finish has also been found to improve the abrasion resistance properties of the fabric.

In one embodiment of the present invention, the chemical composition is made from a solution of a fluorocarbon polymer that is applied to the fabric. For example, the chemical composition can be made from TEFLON polymers which are commercially available from DuPont. Fluorocarbon polymer solutions containing TEFLON polymers are also commercially available from other numerous sources. In one particular embodiment of the present invention, the fluorocarbon polymer composition includes a dispersion of perfluoroalkyl and polyisocyanate polymers.

Besides containing a fluorocarbon polymer, the chemical composition can also contain various other additives. For instance, in one embodiment, the chemical composition can contain a fluorocarbon polymer, an emulsifier, an alcohol, and water. The emulsifier can be, for instance, acetic acid. The chemical composition may also contain a binder, such as an acrylic binder.

In one embodiment, the finish composition can contain from about 2 percent to about 30 percent by weight of a fluorocarbon polymer composition, and particularly from about 4 percent to about 10 percent by weight of the bath. The finish composition can contain about 1% active solids, that is, the fluorocarbon solids. Further, the treatment can contain an emulsifier in an amount from about 7 percent to about 25 percent by weight, and particularly from about 10 percent to about 20 percent by weight of the bath.

In one particular embodiment of the present invention, the flourocarbon polymer composition contains about 8% by weight of a flourocarbon polymer (containing about 1% active solids), such as ZONYL FMX treatment available from Ciba Specialty Chemicals Corporation of Highpoint, N.C. The composition can further contain about 16% by weight of an emulsifier, such as ULTRATEX REP emulsifier also available through Ciba Specialty Chemicals Corporation, about 1 to about 3% by weight of an alcohol, such as isopropanol, and the remainder water.

In order to produce a liquid resistant fabric in accordance with the present invention, after the woven fabric is constructed, the fabric can first be scoured, although scouring may not be necessary for all applications.

After scouring, the fabric will be dried. If desired, the fabric will then be dyed to the desired color by any suitable method. At that point, a water barrier layer may be coated onto what will be the inner surface of the fabric on the final product.

After these processing steps, a chemical composition according the present invention is supplied to at least one side of the fabric. Although the treatment can be sprayed on the fabric or printed on the fabric, preferably the fabric is dipped into a bath containing the chemical composition in solution form.

As stated above, the chemical composition in one embodiment, can be a solution containing a fluorocarbon polymer. The fluorocarbon polymer can be combined in the solution with water, a drying agent such as an alcohol, and an emulsifier. The amount of the water-resistant composition applied to the fabric will depend upon the particular formulation and the particular application.

In one embodiment, the composition is applied to the fabric at a wet pick up rate of from about 10% to about 50% by weight of the fabric, particularly from about 15% to about 30% by weight, and in one embodiment, at a wet pick up rate of about 18–20% by weight of the fabric.

After the chemical composition is applied to the fabric, the fabric is then heated to a temperature sufficient for the finish to dry and/or cure. In one particular embodiment, the finish may be cured by heating the fabric to a temperature of about 390° F. for approximately 1½ minutes. Once the chemical composition is cured and affixed to the woven fabric, the fabric can then be used in constructing luggage and other articles in accordance with the present invention.

The chemical composition of the present invention makes the fabrics water resistant and also improves the abrasion resistance of the fabric. The abrasion resistance of the fabric of the present invention is of great importance in that luggage made with the fabric is better able to withstand wear-and-tear. For instance, fabrics made in accordance with the present invention can have abrasion resistance ratings of at least 2000 cycles, such as from 3000–5000 cycles. In other embodiments, durable fabrics made according to the present invention have abrasion resistance ratings of up to and over 6000 cycles. Of particular importance, it has been discovered that the abrasion resistance of fabrics treated according to the present invention are more than double in comparison to similar untreated fabrics.

Preferred embodiments of the present invention involve the use of the treated water resistant and abrasion resistant fabric in the construction of luggage. However, other items that benefit from improved abrasion resistance may be constructed from the fabric described herein. For example, skates, sportswear, mountain climbing apparel, hockey apparel, skiwear, marine wear, awnings, military apparel, and the like may be constructed using the treated fabric of the present invention.

The present invention may be better understood with reference to the following examples.

EXAMPLE 1

Two different fabric constructions, Fabric A and Fabric B, were tested for various properties. Both of these fabric constructions are suitable for use as luggage fabrics according to the invention herein. Both fabric constructions were of multifilament yarns made of nylon. Specifically, the nylon yarns were obtained from Honeywell, Inc. The yarns were woven into a basket-type weave.

Different chemical finishes were applied to the two fabrics. Fabric A as treated may be obtained from Travis Textiles, Inc. of New York, N.Y. It is sold under the name Tru Ballistic and was treated with a finish containing SEQUAPEL WFC sold by Omnova of Chester, S.C. Sequapel WFC is known to be a fluorocarbon.

The chemical composition of the finish of Fabric B contained 5.2% by weight of a fluorocarbon polymer (ZONYL FMX obtained from Ciba Specialty Chemicals Corp.) composition which contained a dispersion of perfluoroalkyl and polyisocyanate polymers. In addition to the fluorocarbon polymer composition, the finish of Fabric B also contained an emulsifier (ULTRATEX REP obtained from Ciba Specialty Chemicals Corp.) in an amount of 10.4% by weight.

The treatment applied to Fabric B was applied to the fabrics as described above in the detailed description. The fabric had a 1% add on of the fluorocarbon polymer by weight of the fabric.

Tests were performed to examine several properties of the fabrics. The specifications of the fabrics and the results of the testing are described below in Table I.

TABLE I

| Fabric Specifications | Fabric A (Prior Art) | Fabric B |
|---|---|---|
| Warp Yarn Denier | 1050 | 1050 |
| Fill Yarn Denier | 1050 | 1260 |
| Warp Yarn Twists/Inch | 2.5 | 2.5 |
| Fill Yarn Twists/Inch | 2.5 | 3.5 |
| Warp Yarn Count (Yarns/Inch) | 43 | 43 |
| Fill Yarn Count (Yarns/Inch) | 42 | 40 |
| Warp Grab Tensile (lbs.) | 981 | 987 |
| Fill Grab Tensile (lbs.) | 941 | 984 |
| Warp Tear Strength (lbs.) | 217 | 263 |
| Fill Tear Strength (lbs.) | 212 | 341 |
| Raveled Strip (lbs.) of nonabraded strip | 275 | 293 |
| Raveled Strip (lbs.) of abraded strip | 15 | 80 |

EXAMPLE 2

In this Example, several samples of finished fabrics were tested for improved abrasion resistance in comparison to the prior art fabric (Fabric A) described in Example 1. All of the samples were made with nylon multifilament yarns. All fabrics made in accordance with the present invention had a finish add on of 1% add on of the fluorocarbon polymer by weight of the fabric. The treated samples varied in denier and in fill yarn count (picks). The samples also varied in chemical composition of the finish. Sample number 1 used the standard industry finish used on Fabric A in Example 1. The other samples used the 5.2% by weight fluorocarbon polymer composition used on Fabric B in Example 1. The fabric samples' specifications and the results of the Taber Abrasion testing are described in Table 2 below:

TABLE 2

| Sample Number | 1 (Fabric A- Prior Art) | 2 | 3 | 4 | 5 | 6 | 7 |
|---|---|---|---|---|---|---|---|
| Warp Yarn Denier | 1050 | 1050 | 1050 | 1050 | 1050 | 1050 | 1050 |
| Fill Yarn Denier | 1050 | 1260 | 1050 | 1050 | 1050 | 1260 | 1260 |
| Ends | 43 | 43 | 43 | 43 | 43 | 43 | 43 |
| Picks | 42 | 40 | 42 | 44 | 46 | 36 | 38 |
| Weight (OSY) | 12.3 | 13.23 | 12.3 | 12.65 | 12.94 | 12.53 | 12.88 |
| wt. % Fluorocarbon Polymer in Finish | N/A | 5.2 | 5.2 | 5.2 | 5.2 | 5.2 | 5.2 |
| Taber Abrasion Cycles (Range) | 1975–2400 | 3950–5000 | 3500–4500 | 5000–6700 | 4500–7650 | — | — |
| Taber Abrasion Cycles (Average) | 2091 | 4377 | 4264 | 5865 | 5887 | 4500 | 5500 |

As shown above, all of the fabrics made in accordance with the present invention had much better abrasion resistance properties than Sample No. 1. It was also discovered that adding fill yarns increased the abrasion resistant properties of the fabric (compare Sample No.4 to Sample No.5). It was also discovered that fill yarns can be removed without adversely affecting abrasion resistance if the denier of the yarn was also increased (compare Sample No.4 with Sample No.7)

EXAMPLE 3

In this example, the abrasion resistance of a fabric treated in accordance with the present invention was compared to a control fabric having the same construction but not chemically treated.

The fabric tested in this example was made with nylon multifilament yarns and had the same construction as Fabric B of Example 1. A polyurethane coating was applied to one side of the fabric. Three different samples of the fabric were then treated in accordance with the present invention. In particular, the fabric was treated with a chemical composition containing 5.2% by weight ZONYL FMX obtained from Ciba Specialty Chemicals Corporation, 16% by weight ULTRATEX REP also obtained from Ciba Specialty Chemicals Corporation, about 1% by weight isopropanol and about 74% by weight water. The composition was applied to the fabric at a wet pick-up rate of 19% of the weight of the fabric. The samples were then tested for abrasion resistance. Control samples not treated with the chemical composition were also tested for abrasion resistance. The following results were obtained:

TABLE 3

| SAMPLE NUMBER | TABER ABRASION CYCLES | |
|---|---|---|
| | Control | Treated Fabric |
| 1 | 1985 | 2690 |
| | 1990 | 4000 |
| | 1985 | 3878 |
| | 1987 (Avg) | 3523 (Avg) |
| 2 | 1675 | 3998 |
| | 1123 | 3484 |
| | 1980 | 4376 |
| | 1593 (Avg) | 3953 (Avg) |
| 3 | 2161 | 4980 |
| | 1500 | 2530 |
| | 1300 | 5300 |
| | 1654 (Avg) | 4270 (Avg) |
| OverallAverage | 1744 | 3915 |

As shown above, fabrics treated in accordance with the present invention generally have an abrasion resistance rating of at least 3000 cycles. As also shown above, treating the fabrics in accordance with the present invention more than doubled the abrasion resistant properties of the fabric.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed is:

1. A water resistant and abrasion resistant fabric well suited for constructing luggage consisting of:
   a fabric substrate consisting of only a single fabric layer, the single fabric layer being a woven fabric; the woven fabric constructed from multifilament yarns, said yarns comprising nylon, said yarns having a denier of from about 800 to about 1500, said woven fabric having from about 30 to about 60 ends per inch and from about 36 to about 46 picks per inch, said woven fabric having a weight of from about 8 ounces per square yard to about 20 ounces per square yard; and
   a chemical composition applied to said woven fabric, said chemical composition being incorporated into said fabric such that said fabric has an abrasion resistance that is twice the abrasion resistance of the woven fabric not treated with the chemical composition.

2. A fabric as defined in claim 1, wherein said fabric has an abrasion resistance of at least 6000 cycles.

3. A fabric as defined in claim 1, wherein said fabric has an abrasion resistance of at least 8000 cycles.

4. A fabric as defined in claim 1, wherein said woven fabric has a basket weave.

5. A fabric as defined in claim 1, wherein said yarn has a denier of from about 1000 to about 1300.

6. A fabric as defined in claim 1, wherein said chemical composition comprises a fluorocarbon polymer composition.

7. A fabric as defined in claim 1, wherein said yarn has a denier of from about 1000 to about 1400.

8. A fabric as defined in claim 1, wherein the fabric has a basis weight of from about 10 ounces per square yard to about 15 ounces per square yard.

9. A fabric as defined in claim 1, wherein the fabric has from about 40 to about 45 ends per inch and from about 36 to about 46 picks per inch.

10. A water resistant and abrasion resistant fabric composite consisting of:
    a fabric substrate consisting of only a single fabric layer, the single fabric layer being a woven fabric; the woven fabric constructed from multifilament yarns, the yarns comprising nylon, the yarns having a denier of from about 800 to about 1500, the woven fabric having from about 30 to about 60 ends per inch and from about 36 to about 46 picks per inch, the woven fabric having a weight of from about 8 ounces per square yard to about 20 ounces per square yard, the woven fabric having a first side and an opposite second side;
    a chemical composition applied to at least the first side of the woven fabric, the chemical composition being incorporated into the fabric such that the fabric has an abrasion resistance on the first side that is twice the abrasion resistance of the woven fabric not treated with the chemical composition; and
    a water barrier applied to the second side of the woven fabric.

11. A fabric composite as defined in claim 10, wherein the water barrier comprises a material selected from the group consisting of polyurethanes and urethanes.

12. A fabric composite as defined in claim 10, wherein said fabric has an abrasion resistance of at least 6000 cycles.

13. A fabric composite as defined in claim 10, wherein said fabric has an abrasion resistance of at least 8000 cycles.

14. A fabric composite as defined in claim 10, wherein said woven fabric has a basket weave.

15. A fabric composite as defined in claim 10, wherein said yarn has a denier of from about 1000 to about 1300.

16. A fabric composite as defined in claim 10, wherein said chemical composition comprises a fluorocarbon polymer composition.

17. A fabric composite as defined in claim 10, wherein said yarn has a denier of from about 1000 to about 1400.

18. A fabric composite as defined in claim 10, wherein the fabric has a basis weight of from about 10 ounces per square yard to about 15 ounces per square yard.

19. A fabric composite as defined in claim 10, wherein the fabric has from about 40 to about 45 ends per inch and from about 36 to about 46 picks per inch.

* * * * *